April 22, 1969   H. A. CAMERON   3,440,558
HIGH REPETITION RATE LASER
Filed Nov. 12, 1964   Sheet 2 of 2
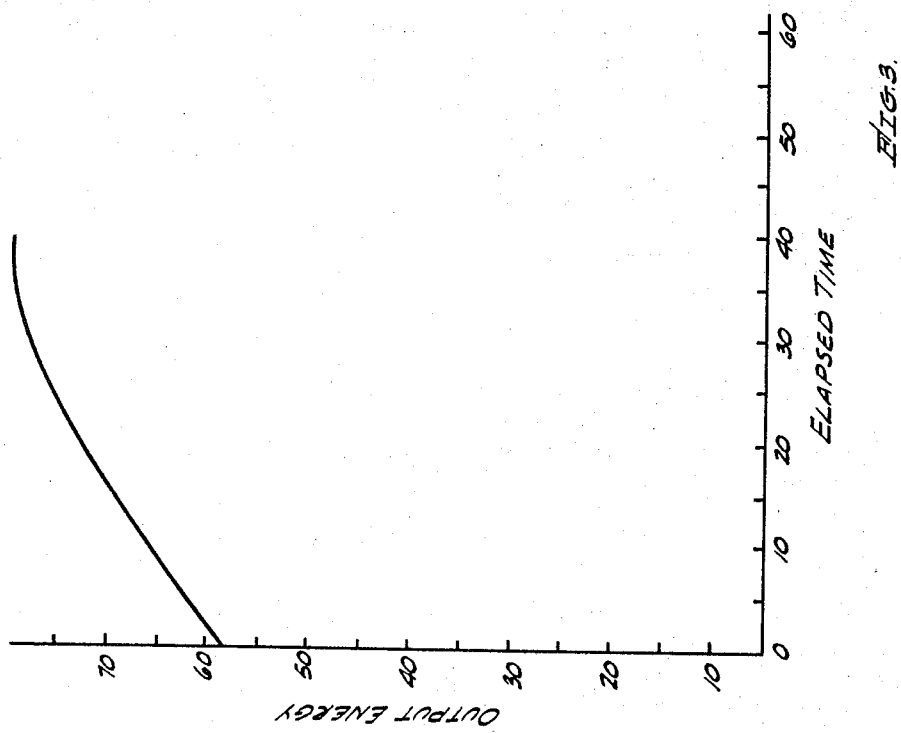
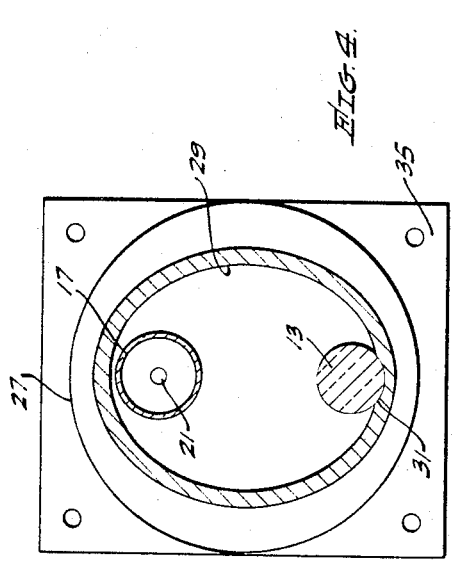
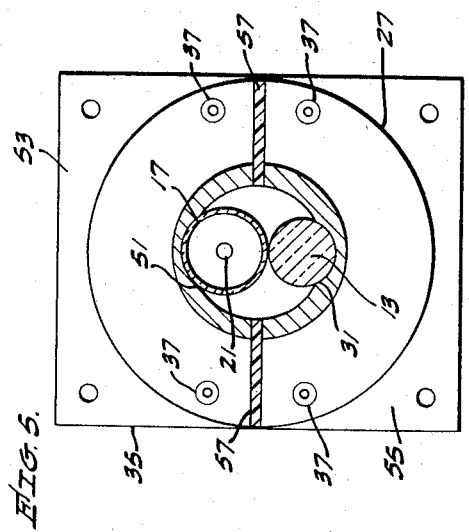
INVENTOR.
HAROLD A. CAMERON,
BY J. K. Haskell
ATTORNEY

# United States Patent Office 3,440,558
Patented Apr. 22, 1969

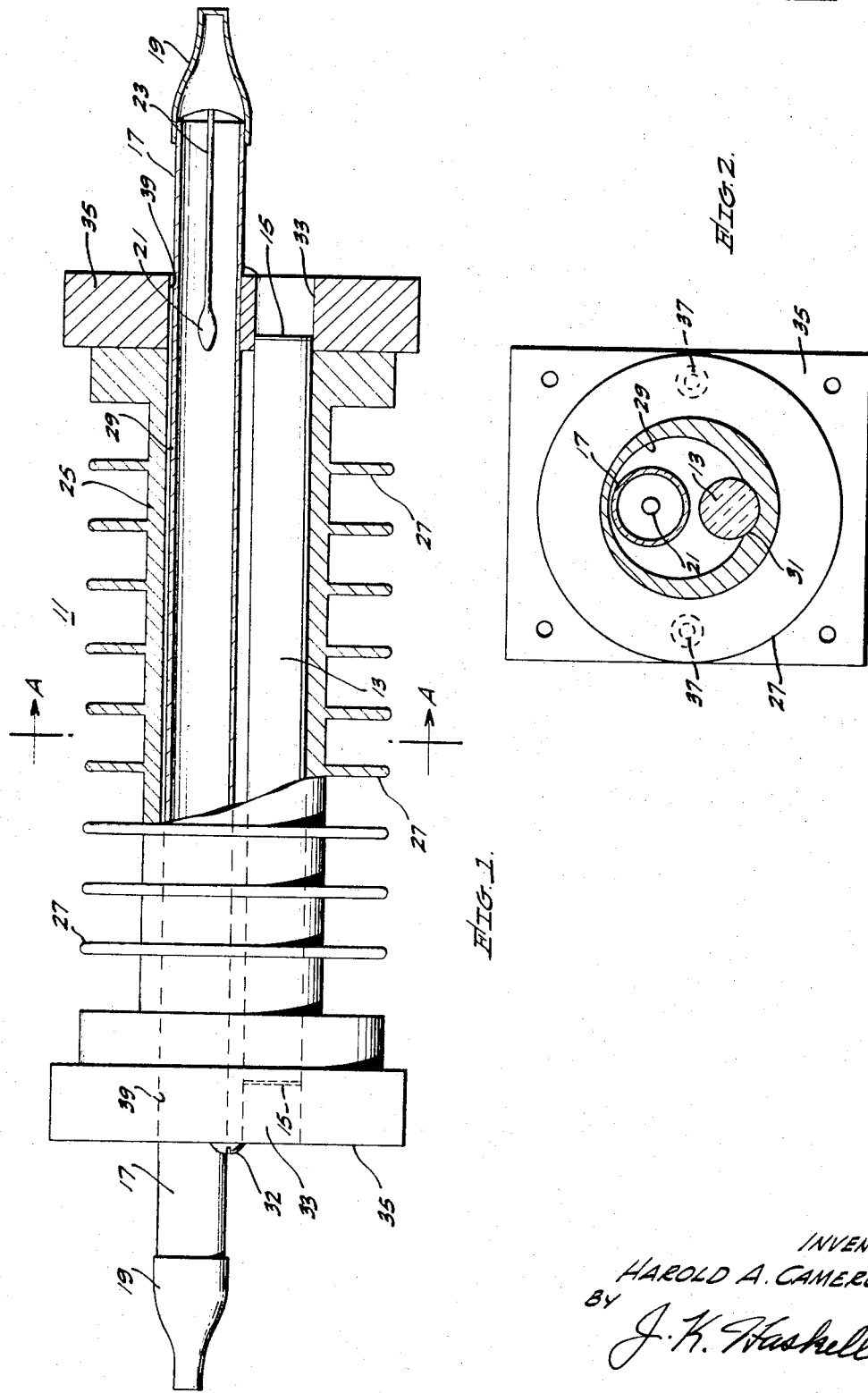

3,440,558
HIGH REPETITION RATE LASER
Harold A. Cameron, Inglewood, Calif., assignor to Hughes Aircraft Company, Culver City, Calif., a corporation of Delaware
Filed Nov. 12, 1964, Ser. No. 410,507
Int. Cl. H01s 1/06
U.S. Cl. 331—94.5                                    2 Claims

ABSTRACT OF THE DISCLOSURE

This is a laser wherein a solid-state active element is rapidly cooled to allow relatively high power-rapid rate pulse operation by partially embedding the active element along its length in a longitudinal polished groove in the inner surface of one of two longitudinal half sections of a pump cavity structure. A flash lamp is partially embedded in the opposite half section and a relatively thin heat insulated gasket is disposed between the two sections of the pump cavity to isolate the heat dissipated by the lamp from the active laser element.

---

This invention relates to a high repetition rate laser and more particularly to a laser configuration wherein the solid-state active element is rapidly cooled to allow relatively high power-rapid rate pulse operation or possibly somewhat lower power-continuous operation.

Since the first reporting of an operational laser in the summer of 1960 by Dr. T. H. Maiman in an article entitled "Optical Laser Action in Ruby," Nature, 137, p. 493, much progress has been made finding new lasing materials which provide new modes and frequencies of operation. However, by far the most widely used active laser material is the same chromium-doped ruby material first discovered by Dr. Maiman.

Scientists, after working with ruby for only a short time, soon found that as the average power of the ruby laser was increased, the heat generated in and around the ruby rod-like element increased to a point where laser action ceased. This heat barrier has been fully discussed in an article entitled "Effects of Elevated Temperature on the Fluorescence on Optical Maser Activity of Ruby" by James P. Wittke, published in Journal of Applied Physics, vol. 33, No. 7, July 1962. In attempting to overcome this problem, scientists have utilized forced air and cryogenic techniques and have even experimented with hollow ruby rods wherein a coolant is forced to flow. However, these attempts to overcome the heat barrier have proved to be very expensive, bulky, and for the most part very ineffective. For example, in the case of the most popular method, which is forcing air through the pump cavity along the ruby rod, there is a tendency for the polished interior of the pump cavity to tarnish and also become less efficient because of impurities introduced from the flowing air. Consequently, it has been necessary to operate high power ruby lasers in a pulse mode at a relatively slow repetition rate.

Another approach in an attempt to solve this problem has been in the design of the laser pump cavity configuration under the theory that if substantially all of the optical pumping energy can be focused on the ruby rod, less pump energy will be wasted in directly heating the pump cavity which in turn will heat the ruby. One example of this approach was the use of a large elliptical pump cavity configuration providing good focusing characteristics but which resulted in a large air space between the laser rod and the cavity inner wall. When operating this laser configuration at a high repetition rate, the laser rod became extremely hot and soon stopped lasing since there was a very poor thermal path to conduct the heat away from inside the cavity.

Another example of this approach was the placing of the pump flash lamp and the ruby rod in close proximity to each other, surrounded by such materials as aluminum foil or magnesium oxide. This arrangement is called "close coupling." The efficiency was found to be good, but like the elliptical cavity, this technique did not supply an adequate heat sink and resulted in high heat build up in the laser rod.

A solution to this heat problem would allow high average power operation that would be extremely useful in such applications as laser Doppler radar systems, laser communcations and the like. Thus, it should be evident that a laser configuration which provides high efficiency and good heat transfer away from the active laser element would be of great importance in the laser art.

It is therefor an object of the present invention to provide an improved solid-state laser.

It is another object of the invention to provide an improved solid-state laser capable of producing a high average power output.

It is still another object of this invention to provide a relatively high power solid-state laser which has a high repetition rate useful in laser Doppler radar systems and the like.

From the above discussion of the prior art, it can be seen that the prejudice in the art was to place the active ruby element in a position within a pump cavity that was considerably spaced from or at least not in contact with the pump cavity inner wall. This was thought to be desirable and necessary in order to obtain the best pump efficiency. Contrary to this prejudice in the prior art, the present invention specifically teaches the placing of the active ruby element in contact with the pump cavity.

Accordingly, the above-mentioned objectives are achieved in a high repetition rate laser that in one embodiment of this invention comprises a relatively good heat conducting solid-state laser rod disposed in an optical resonant cavity which is adapted to support laser energy produced therein. Also included is a pump flash lamp that produces optical frequency energy to pump the laser rod to an excited state, thus producing laser energy. Surrounding both the laser rod and the flash lamp is a pump cavity structure which has a highly reflective inner wall surface in which is partially embedded a portion of the circumference of the laser rod for substantially the length of the rod.

In another embodiment of the invention, advantage is taken of the high efficiency available in the above-described "close coupling" technique by placing the flash lamp and the partially embedded laser rod in very close or actual contact with each other. In still another embodiment, both the flash lamp and the laser rod are partially embedded in the pump cavity inner wall while being in close proximity to each other to provide a very efficient manner to control the temperature of the laser rod and the flash lamp.

The invention and specific embodiments thereof will be described hereinafter by way of example and with reference to the accompanying drawings, in which:

FIG. 1 is a side view, partially broken away, of an embodiment of a high repetition rate laser according to this invention;

FIG. 2 is a sectional view of the laser shown in FIG. 1 taken along a—a;

FIG. 3 is a graph of recorded data taken from the operation of a laser constructed in accordance with the inventive features of the invention.

FIG. 4 is a sectional view of another embodiment of the invention; and

FIG. 5 is a sectional view of still another embodiment of the invention.

With reference now to the drawings and in particular to FIGS. 1 and 2, there is here illustrated a high repetition rate laser, designated generally by the reference numeral 11. The laser 11 comprises a relatively good heat conducting solid-state laser rod such as the ruby rod 13 disposed in an optical resonant cavity, which in this arrangement consists of silvered mirrors 15 plated on the ends of the rod 13 or it may consist of two conventional external mirrors (not shown) which reflect light frequency energy produced by the rod 13. At least one of these mirrors is partially transmissive to provide a useful laser output. A conventional tubular pump xenon flash lamp 17 is positioned adjacent and parallel to the rod 13 and has anode terminals 19 on each end thereof connected to a conventional source of electrical pump energy not shown. The flash lamp 17, of course, includes anode electrodes 21 (only one shown) disposed therein and connected by wires 23 to the terminals 19. Surrounding both the laser rod 13 and the flash lamp 17 is an aluminum pump cavity structure 25 including a plurality of cooling fins 27 and a highly reflective polished inner wall surface 29. The pump structure 25 also includes a groove 31 shaped to accept a portion of the circumference of the laser rod 13 for the length of the rod. The laser rod 13 is held in contact with the channel 31 in this embodiment by holes 33 in similar end blocks 35 attached to the pump structure 25 by screws 37. The end blocks 35 are also provided with holes 39 in order to hold the flash tube 17 in a position parallel and relatively close to the laser rod 13. The pump structure 25 is fabricated from aluminum, but any good heat conducting material may be used. Also, for the sake of pumping efficiency, the groove 31 is polished to reflect any pump energy incident on its surface.

Mounting the ruby laser rod 13 in good thermal contact with a good heat sink such as the pump cavity structure 25 replaces the prior art ruby-air boundary with a ruby-aluminum boundary. Since the thermal conductivity of air is approximately $10^{-6}$ cal/cm.$^2$ °C.-cm. sec., the improvement effected by the addition of aluminum (conductivity of 0.52) at the boundary layer is striking. Thus, by keeping (in this embodiment) approximately one third of the circumference area of the ruby rod 13 in contact with the pump cavity structure 25, enough heat can be removed to operate the ruby 13 at a high repetition rate. The aluminum structure 25 itself acts as a heat sink for the ruby rod 13 and is in turn cooled at its outer surface by conventional means such as allowing Freon to evaporate in the area of the fins 27.

From FIG. 2 it can be seen that the ruby rod 13 and the flash lamp 17 are in close proximity to each other and therefore may be considered to be "close coupled." Therefore, in this embodiment the advantage of "close coupling" (good pump efficiency) is combined with the good heat transfer characteristic enjoyed when a relatively good heat conducting active laser element is partially embedded in the inner wall of a pump cavity having good heat transfer properties.

The benefits to be derived from the use of this latter feature in applications where large quantities of heat must be used in the form of pumping energies is best demonstrated by considering the differential equation for heat flow. The flow. The flow per unit area from a surface of conductivity $k$ is given by:

$$\frac{2H}{2t} = k\vec{\Delta T} \cdot \vec{n}$$

where $\vec{\Delta T}$ is the temperature gradient in the conducting medium and $\vec{n}$ is the outward flow normal to the surface. It is apparent from the above formula that either the temperature gradient, $\vec{\Delta T}$ or the thermal conductivity must be increased if the flow of heat from the system is to meet the demands placed upon it. Since the temperature gradient must be kept relatively small to permit reliable operation of the ruby, increasing the conductivity will permit the removal of heat to be made at a rapid pace.

The results of a test of a high repetition rate laser constructed according to the embodiment of the invention just described is given in graphical form in FIG. 3. The output energy from this laser is displayed as a function of time for a one c.p.s. repetition rate. As can be seen from the graph, the thirteenth pulse was of a greater amplitude than the first pulse. The slope of the curve indicates that the temperature of the ruby rod used was decreasing. In general, it was found, all other parameters remaining constant, the gain of the ruby increased as the temperature was lowered from room temperature (300° K). In addition, the cavity operates with good efficiency, having a threshold less than one hundred joules (normal laser action) and producing an output of more than three hundred millijoules at an input of 180 joules.

Operation in a Q-switched configuration has produced single output pulses in a region of output energy of 200 millijoules. The relative efficiency was less than efficiencies attained in the highly developed elliptical cylinder pump cavities, but the great advantage derived for high repetition operation of the invention by the low thermal relaxation time much offset the relatively small decrease in efficiency.

Another embodiment of the invention is illustrated in FIG. 4 where only a sectional view is shown for simplicity. This and the following described embodiment are somewhat structurally similar to the one described above and, therefore, like elements and components are identified by like reference numerals. In this embodiment, the ruby rod 13 and the flash lamp 17 are not in a "close coupled" configuration. The pumping efficiency here is not as good as the first described embodiment, but since the ruby rod 13 is partially embedded in the aluminum pump cavity structure 25, the temperature of the ruby 13 may be controlled to provide an advantageous device.

FIG. 5, on the other hand, illustrates a further embodiment which again utilizes "close coupling." However, contrary to the embodiment of FIGS. 1 and 2, here, not only the ruby rod 13 but also the flash lamp 17 is partially embedded in the pump cavity structure 25. In order to prevent the heat generated by the flash lamp 17 and transferred to a grooved portion 51 of the structure 25 from affecting the temperature of the ruby 13, the pump cavity 25 is fabricated in two similar portions, an upper portion 53 and a lower portion 55 insulated from each other by a mica separator 57. Since the upper and lower portions 53 and 55 of the pump cavity 25 are thermally insulated from each other by the mica separator 57, the temperatures of the ruby rod 13 and the flash lamp 17 may be controlled separately for optimum operation.

In order to obtain the best pump efficiency, the surface of the groove 31 in the pump cavity structure 25 should be highly reflective for the frequency of light produced by the flash lamp 17. This may be accomplished by any conventional method such as polishing or plating the surface of the groove 31 and seating the ruby rod 13 therein.

From the foregoing, it will be evident that the invention provides a solid-state laser which is capable of high power-high repetition rate operation having many useful applications such as in laser Doppler radar systems, for example.

Although ruby has been described as the active laser element in the various embodiments of the invention, any other laser material having relatively good heat conducting properties may be substituted. Similarly, other organizations of the specific arrangements shown may be made within the spirit and scope of the invention. Furthermore, although in the embodiments shown the active laser element is embedded so that from 10 to 30% of its circumference for the length of the element is in contact with the pump cavity, actual tests have indicated that advantageous results were obtained with 50% circumference contact. It should be obvious that by increasing this circumference contact beyond 50% the heat transfer between the active element and the pump cavity is increased, but the pumping efficiency will be substantially decreased.

Accordingly, it is intended that the foregoing disclosure and drawings shall be considered only as illustrations of the principles of this invention and are not to be construed in a limiting sense.

What is claimed is:

1. A high repetition rate laser, comprising: optical resonant cavity means having a longitudinal axis and adapted to support laser energy produced therein; a longitudinal rod of solid-state laser material disposed within said resonant cavity parallel to said longitudinal axis; pump means including a linear flash lamp for producing pump energy to excite and rod to a lasing state; and pump cavity means of relatively good heat conducting material having a longitudinal axis substantially paralel to that of said resonant cavity, said pump cavity means having a highly light reflective inner surface enclosing both said rod and said flash lamp, said pump cavity means being comprised of two longitudinal half sections mechanically separated from each other by a relatively thin heat insulative gasket, one of said sections having a longitudinal polished groove in its inner surface wherein said rod is partially embedded along its length and the other of said sections having a longituinal polished groove in its inner surface wherein said flash lamp is partially embedded, each of said sections having an outer surface adapted to efficiently transfer heat from respective outer surfaces.

2. A high repetition rate laser as in claim 1 wherein in said solid-state laser material is ruby.

References Cited

UNITED STATES PATENTS

| | | | |
|---|---|---|---|
| 3,355,674 | 11/1967 | Hardy | 331—94.5 |
| 3,387,227 | 6/1968 | Mastrup et al. | 331—94.5 |
| 3,164,781 | 1/1965 | Goldberg | 331—94.5 |
| 3,179,898 | 4/1965 | Meltzer | 331—94.5 |
| 3,229,222 | 1/1966 | Sorokin et al. | 331—94.5 |
| 3,356,966 | 12/1967 | Miller | 331—94.5 |

RONALD L. WIBERT, *Primary Examiner.*

T. MAJOR, *Assistant Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,440,558                                                         April 22, 1969

Harold A. Cameron

It is certified that error appears in the above identified patent and that said Letters Patent are hereby corrected as shown below:

Column 2, line 14, after "communications" insert -- systems --; line 18, "therefor" should read -- therefore --; line 33, "projudice" should read -- prejudice --. Column 3, line 41, "$^0$C.-cm." should read -- C.$^\circ$-cm. --; line 65, cancel "The flow.". Column 3, lines 69 and 74 and column 4, line 7, "$\Delta$", each occurrence, should read -- $\nabla$ --; same column 4, line 19, "thirteenth" should read -- thirtieth --; line 35, "offset" should read -- offsets --. Column 5, line 27, "and", first occurrence, should read -- said --. Column 6, line 1, "paralel" should read -- parallel --; line 10, "longituinal" should read -- longitudinal --.

Signed and sealed this 14th day of April 1970.

(SEAL)
Attest:

Edward M. Fletcher, Jr.                                     WILLIAM E. SCHUYLER, JR.
Attesting Officer                                                  Commissioner of Patents